S. SLISHMAN.
FUEL TANK.
APPLICATION FILED JAN. 4, 1921.
1,437,823.
Patented Dec. 5, 1922.
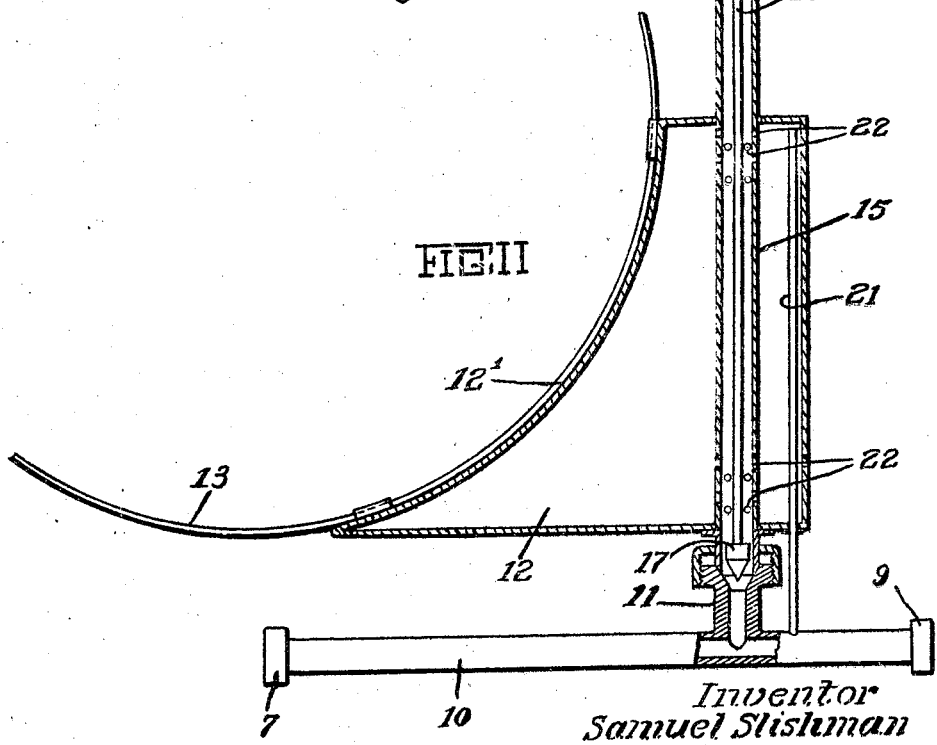
Inventor
Samuel Slishman
By Ellis Spear Jr.
attorney Patented Dec. 5, 1922.

1,437,823

UNITED STATES PATENT OFFICE.

SAMUEL SLISHMAN, OF BOSTON, MASSACHUSETTS.

FUEL TANK.

Application filed January 4, 1921. Serial No. 435,029.

*To all whom it may concern:*

Be it known that SAMUEL SLISHMAN, a citizen of the United States, residing at Boston, county of Suffolk, Commonwealth of Massachusetts, has invented certain new and useful Improvements in Fuel Tanks, of which the following is a specification.

The subject matter of my present invention involves certain improvements of reserve or emergency supply. While capable of somewhat varied application and use, my present invention is especially adapted to the gasolene supply of an automobile. In the form shown and particularly discussed herein, I shall deal with an embodiment particularly adapted for use with the cylindrical gasolene tank now in very common usage in a certain popular priced car.

In this specific view of my invention I take advantage of this cylindrical shape of the tank which in the car referred to is placed in horizontal axis below the seat. This disposition permits me to construct a long, narrow reserve tank somewhat triangular in cross section, and makes possible a very convenient assembly and combination, all without need of seriously disturbing or modifying the general piping of the fuel supply. As this form of my invention is both characteristic and is in itself a highly successful and popular form, I have chosen it as an illustrative embodiment and shall so discuss it in the specification. Throughout the specification and drawings like reference characters are employed to indicate corresponding parts and in the drawings:

Fig. I is a side elevation showing a side view of the main tank and auxiliary tank in position, and Fig. II an enlarged sectional view of my auxiliary tank and fittings.

Referring to Fig. I, I have indicated at 1 the usual cylindrical main tank disposed in horizontal axis within the walls 2 and 3 supporting the front seat S and resting on the floor boards 4. The tank has an outlet 5 through the floor 4 drained by a pet cock 6 and connects by a union 7 with the usual pipe line 8 of the fuel feed system. In installing my auxiliary tank the main pipe line 8 leading to the carburetor is provided with an additional union 9 and between the unions 7 and 9 a T-fitting 10—11 is installed. This fitting enters the auxiliary tank 12 from below.

The reserve tank 12 is an elongated shell running across the car and positionable along the lower part of the main tank 1. The auxiliary tank has a curved inner surface 12' adapted to conform to the curvature of the tank 1 and a base and outer wall at right angles to each other to conform to the wall 2 and floor 4 of the automobile, and vertical end walls. Said tank may be conveniently secured to the main tank 1 by one or more straps 13 provided with fastenings 14.

Arranged vertically within the reserve tank 12 is a tubular guide 15 for a valve stem 16 having a valve 17 at its lower end seating within the fitting 11 and normally held against its seat by a coiled spring 18 confined within the guide 15, as shown in Fig. II. At its upper end the stem 16 has a head 19 adapted to be engaged by a turn button 20 pivoted on the upper face of the wall 2 when the valve stem is raised to unseat the valve 17 and permit the contents of the reserve tank to flow into the main line 8.

The reserve tank is filled by and during the filling of the main tank through the usual filling opening thereof. In such action, the fuel flows through outlet 5 along pipe 8 into the fitting 11 and from said fitting into the reserve tank 12 through branch or run back pipe 21. The run back pipe 21 enters tank 12 adjacent the top thereof. Tank 12 may be suitably vented, as indicated at 22.

In use, when main tank 1 is emptied, reserve tank 12 may be drawn upon by simply raising valve stem 16 to unseat valve 15. The stem 16 may be held in raised position during service from the reserve tank by means of the turn button 20. The head 19 of the valve stem and the button 20 are both conveniently accessible for operation from the driver's seat.

Various modifications in the form and construction of my device may obviously be resorted to if within the limit of the appended claims.

What I therefore claim and desire to secure by Letters Patent is:—

1. In combination with a main cylindrical fuel tank of horizontal axis, an auxiliary tank having a side concaved to conform to the cylindricity of said main tank, a supply line from the main tank, an outlet connection between said auxiliary tank and said supply line, a valve for said outlet and a run back pipe extending from said outlet below said valve and terminating adjacent the top of said tank.

2. In a motor vehicle, a seat structure comprising a flooring, spaced front and rear walls and connecting end walls rising therefrom, a seat supported on said walls, a cylindrical main fuel tank arranged horizontally in the space beneath said seat and having an outlet, an auxiliary fuel tank comprising bottom, front and end walls arranged at right angles to each other to snugly fit against the flooring and front and end walls of the seat structure and a curved rear wall conforming to the curvature of the main fuel tank, a supply line connecting with said outlet of the main tank and having a fitting connecting with said auxiliary tank, a valve controlling said fitting and permitting discharge of the auxiliary fuel into said supply line, and a filling pipe in said supply line and discharging into said auxiliary tank.

3. In a motor vehicle, a seat structure comprising a flooring, spaced front and rear walls and connecting end walls rising therefrom, a seat supported on said walls, a cylindrical main fuel tank arranged horizontally in the space beneath said seat and having an outlet through said flooring, an auxiliary fuel tank comprising bottom, front and end walls arranged at right angles to each other to snugly fit against the flooring and front end walls of the seat structure and a curved rear wall conforming to the curvature of the main fuel tank, a supply line connecting with said outlet of the main tank and having a vertically disposed fitting connecting with said auxiliary tank and constituting a valve seat, a vertically movable spring-tensioned valve stem having a valve cooperative with said seat and permitting discharge of the auxiliary fuel into said supply line, a filling pipe in said supply line beyond said fitting and discharging into said auxiliary tank, and a catch mounted on the front wall of the seat support and engaging the upper end of said valve stem to hold said stem raised and the valve opened.

4. In a fuel supply system a main fuel tank, an auxiliary fuel tank, a supply line connecting with the main tank and having a vertically disposed fitting connecting with said auxiliary tank and constituting a valve seat, a perforated guide disposed as an extension of said fitting, a vertically movable spring-tensioned valve stem in said guide having a valve cooperative with said seat and permitting discharge of the auxiliary fuel into said supply line, a filling pipe in said supply line and discharging into said auxiliary tank, and a turn button engaging the upper end of said valve stem to hold said stem raised and the valve opened.

5. In an auxiliary supply for a liquid fuel system having a main tank and a supply line leading therefrom, a reserve tank supported adjacent said main tank, a fitting extending from the supply line and having a valve seat, a guide alined with said fitting and having perforations opening into said reserve tank, a valve stem in said guide having a valve at its lower end cooperating with said seat and bent at its upper end and having a collar between its ends, a spring coiled about said stem between said collar and the upper end of the guide, and a turn button engageable with the bent portion of said stem to raise said stem and open the valve.

6. In a motor vehicle having a substantially rectangular chamber, a substantially cylindrical main fuel tank mounted within said chamber, an auxiliary fuel tank mounted within said chamber upon the bottom thereof and having a curved wall conforming to the curvature of the main fuel tank, a supply line connecting with said tanks, a valve stem having a valve controlling the discharge of fuel from said auxiliary tank into said supply line, said stem extending vertically through said auxiliary tank and thereabove into the space between said main tank and the adjacent vertical wall of said chamber, and a catch mounted on said adjacent vertical wall of the chamber and engageable with the upper end of said stem for holding said stem raised and the valve open.

In testimony whereof I affix my signature in presence of two witnesses.

SAMUEL SLISHMAN.

Witnesses:
 GEO. B. RAWLINGS,
 VICTORIA LOWDEN.